United States Patent [19]

Spaay

[11] Patent Number: 4,883,624
[45] Date of Patent: Nov. 28, 1989

[54] METHOD AND APPARATUS FOR MANUFACTURING BLANKS OF SEMI-FINISHED PRODUCTS

[75] Inventor: Albert J. Spaay, Bretten, Fed. Rep. of Germany

[73] Assignee: Matec Holding AG, Kusnacht, Switzerland

[21] Appl. No.: 143,274

[22] Filed: Jan. 6, 1988

Related U.S. Application Data

[63] Continuation of Ser. No. 835,229, Mar. 19, 1986, abandoned.

[30] Foreign Application Priority Data

Mar. 5, 1985 [DE] Fed. Rep. of Germany ....... 3507720

[51] Int. Cl.[4] .................. B29C 31/08; B29C 43/02; D04H 5/04
[52] U.S. Cl. .............................. 264/112; 156/166; 264/115; 264/257; 425/81.1; 425/82.1; 425/297; 425/DIG. 201
[58] Field of Search .............. 264/109, 113, 115, 120, 264/136, 137, 117, 257, 324, 258, 103, 112; 425/81.1, 82.1, 297, DIG. 201; 156/176, 177, 178, 166

[56] References Cited

U.S. PATENT DOCUMENTS

| 3,804,934 | 4/1974 | Ball | 264/137 |
|---|---|---|---|
| 3,975,483 | 8/1976 | Rudloff | 264/137 |
| 4,146,564 | 3/1979 | Garrick et al. | 264/258 |
| 4,645,631 | 2/1987 | Hegenstaller et al. | 264/113 |

FOREIGN PATENT DOCUMENTS

| 841727 | 7/1949 | Fed. Rep. of Germany | 264/137 |
|---|---|---|---|
| 27474 | 3/1977 | Japan | 264/137 |
| 10109 | 4/1978 | Japan | 264/137 |
| 856427 | 12/1960 | United Kingdom | 264/137 |

Primary Examiner—James Lowe
Attorney, Agent, or Firm—Mason, Fenwick & Lawrence

[57] ABSTRACT

A process is provided for manufacturing blanks comprising the production of a batch of fiber-reinforced synthetic resin compound, the production of a piece of fiber mat, depositing the batch of compound onto the piece of fiber mat, and conveying them together into a press for molding them together. In such a process, the initial step of producing the fiber-reinforced synthetic resin compounds and in producing the fiber mat is the production of a running length of fiber, which is then either cut and combined with resin compounds for the production of the noted batches, or placed on a conveyor and combined with additional compound; the process includes operating the fiber producing apparatus and delivering the fibers produced to a cutting means of the equipment for producing the fiber-reinforced synthetic resin compounds for a first period of time and then delivering the fiber to the conveyor for the production of a fiber mat for a second period of time.

Apparatus is provided comprising means for producing continuous lengths of mono filament, a molding plant for receiving mono filament, cutting it into short lengths, and combining it with resin compounds, and then forming batches of fiber-reinforced compound under compression; means for producing resin bonded fiber mats comprising a conveyor belt for receiving mono filament and for depositing resin thereon, for cutting pieces of mat from the mat thereby produced, associating batches of fiber-reinforced compound with pieces of the fiber mat, and delivering the fiber mat pieces together with the synthetic resin compound batches on them to a molding press.

13 Claims, 5 Drawing Sheets

METHOD AND APPARATUS FOR MANUFACTURING BLANKS OF SEMI-FINISHED PRODUCTS

This application is a continuation of application Ser. No. 835,229, filed Mar. 3, 1986, and now abandoned.

BACKGROUND OF THE INVENTION

The invention relates to a working method for manufacturing blanks of fiber-reinforced synthetic resin stock or compounds, which are used for the manufacture of synthetic resin goods by means of the compression molding process. When such synthetic resin stock, known as "SMC" (Sheet Moulding Compound), is being processed to the finished product, which is the synthetic resin object, the attempt is made to arrange the fabrication technique in such a manner that the finished product is provided with the best possible physical properties.

Glass fibers of monofilaments bundled to rovings are given preference as reinforcing fibers, but fibers of organic substances such as polyester, polyamide, aramide and the like are also used, which comes straight from the spinning plant or are taken off delivery spools in an endless manner and —mixed with cut fibers— are fed to a moulding plant. In such plants, the fibers are embedded into the moulding compound of resin composition and fillers, see for example German patent specification No. 22 47 142.

In this connection, the SMC coming out of the plant is enclosed in plastic films, so that it can be conveniently transported and stored, e.g. in rolls. If the compound is not enclosed in film, then it can be loaded into containers only in batches, and further processing is greatly impeded.

Even in the case of the compound embedded in films, the film has to be removed before the compound is fed into the moulding press, and this is always done by hand. Then mouldable lots have to be cut by hand from the compound and laid together, in order then to be placed into the mould, an operation which also is performed by hand.

SUMMARY OF THE INVENTION

The invention is directed to improving the manufacturing procedure for SMC, of rendering possible an automatic portioning of the compound and an automatic feed to the moulding press, and moreover of exercising a favourable influence on the orientation of the reinforcing fibers in the finished product (moulded article). According to the invention, this aim is achieved by having a portion of the fiber-reinforced synthetic resin compound placed onto a piece of fiber mat serving as support, and then by having this portion, which is of adequate size for the synthetic resin article to be moulded, fed into the die of the moulding press together with the piece of fiber mat.

The piece of fiber mat serves as support for the otherwise unmanageable portion of synthetic resin compound and advances with the compound into the die. The pressing operation makes it a component of the fiber reinforcing of the synthetic resin article and improves the physical properties of this latter. This essential feature of the invention can also be availed of if a compound enclosed in foils is to be used. The foils are then stripped off by hand as usual, the compound is arranged into portions and placed onto the pieces of fiber mat as support.

However, it is much more advantageous, according to further features of the invention, if a moulding plant is taken as basis, whereby the synthetic-resin compound without foil packing comes out of said plant into a vibrating hopper, connected to which is a portioning or metering device. The compound comes out of the portioning device in portions suitable for the moulding operation and is deposited onto pieces of fiber mat, which pieces are supplied by a punching device fed with fiber mats. By means of corresponding control and programming facilities, the portions can be adapted to the requirements of the production, meaning to the different matrices present in several series-connected presses. With a single plant operating continuously according to the invention and a plurality of presses, it is then possible to manufacture different finished products simultaneously.

The working method for manufacturing blanks of fiber-reinforced synthetic resin compound for automatically feeding synthetic resin moulding presses is described hereinbelow.

Various types of equipment can be used for portioning, for example a modified extruder with a particularly short conic pattern of housing and screw, with the aim of damaging as little as possible the reinforcing fibers in the moulding stock. The moulding stock or compound is transferred from the hopper of the moulding plant via a mixer or kneader (paddle kneader, turbonkneader or paddle mixer) into the extruder. A cutting device portions the emerging strand according to length, with the result that sections of equal length, meaning of equal mass as well, are deposited onto the delivered pieces of fiber mat.

More advantageous is the working method with a reciprocating compressor as the portioning device. In this connection, the synthetic resin compound advances from the hopper outlet of the moulding plant into a compression cylinder (main cylinder), in which a compression piston is movable backwards and forwards. The cylinder has a part which is open towards the hopper and which is blocked by the piston in one of its limit positions. Towards the other end, the cylinder is of such a length that it can receive the compound fed in out of the hopper in a compressed state, and the cylinder also is under vacuum for the purpose of avoiding air bubbles in the entering compound. The end of the cylinder is shut off by a cover which is displaceable vertically to the piston movement and which is connected to a second cylinder in such a manner that in the one position the cover shuts off the main cylinder and in the other position the second cylinder replaces the cover, with the result that the compound can transfer from the main cylinder into the second cylinder. The piston in the second cylinder exercises an adjustable counterpressure. By adjusting this counterpressure, the density and fed quantity can be adjusted. When the adjusted fed quantity is reached, then the second cylinder slides downwards and the cover connected thereto closes the main cylinder. The piston of the second cylinder ejects the portion of moulding compound stored in the cylinder and deposits it on the piece of fiber mat which was delivered by a positioning facility and which comes from the punching device of the fiber mat plant.

The arrangement of a fiber mat plant which would be suitable within the meaning of the invention corresponds to the constructions which are known in themselves. On an endless conveyor belt, endless rovings are deposited in overlapping loops by means of a pneumatic spreader device which executes lateral movements at right angles to the direction of running of the conveyor belt. It is favourable to arrange at least six spreader points over a width of 1.5 meters and to add binders by means of spray attachments. If desired, additional endless unidirectional rovings (i.e. lying parallel in the direction of running of the conveyor belt) or cut rovings can also be deposited via additional feeding points. Instead of rovings or in addition to them, fibers of organic plastic materials can be charged. An optimal fiber mat as regards fiber orientation and the physical properties of the finished product will be obtained if when manufacturing said fiber mat two or three spreader plants are arranged behind one another in the direction of the conveyor belt, so that in the first spreader plant rovings with the fiber sizes 50 to 60 Tex units are deposited, and in the other spreader plants 100 to 200 Tex units and 200 to 400 Tex units.

The punching device to which the fiber mat is advanced can accomodate different interchangeable punching tools, so that pieces of fiber mat are obtained which with respect to their contour are adapted to the finished article to be moulded.

The plant equipment necessary for the performance of the working method of the invention can be utilised to maximum advantage for carrying out continuous operation. For this purpose, only a single continuously operating automatic spinning machine for rovings is necessary, such that the fiber reinforcing for the synthetic resin compound is produced during the normal working time, e.g. in two shifts of 8 hours each, whereas the fiber reinforcing for the resin-bonded fiber mat is produced outside the normal working time, e.g. in the night shift. It is a known fact that spinning plants have to be kept working all the time, since starting up the furnaces and spinning equipment is very expensive. The spinning plant is installed in such a manner that it can operate together with the moulding compound plant or optionally with the fiber mat plant. For this purpose, either the outlet parts of the spinning plant or the initial parts of the moulding compound plant or fiber mat plant are laterally displaceable or slewable and the plants are set up accordingly beside one another.

The production would then take place in such a way for example, that in the case of a 24-hour working day the spinning plant operates together with the moulding compound plant during 16 hours of the day time to produce the synthetic resin moulding compound, whereas in the 8 hours of the night time the spinning plant operates together with the fiber mat plant to produce fiber mats. The fiber mats, that is to say the pieces of fiber mat manufactured therefrom, are produced for storage and are stacked on the positioning device. Then, when the moulding compound plant is working together with the spinning plant during the subsequent operating period, the pieces of fiber mat are taken from storage as already described and brought to the portioning device and are fed from there to the presses. A necessary condition here of course is that when starting up the continuous operation for a start the spinning plant works together with the fiber mat plant. Pauses can be interspersed of course, and the portions of moulding compound deposited onto pieces of fiber mat can be stored for some time, should this be desirable or perhaps necessary on operational grounds, but then they must be stored between PE foils, for otherwise there would be a loss of styrene after a fairly extended storage period. Basically, however, it is possible to work in continuous operation for days and weeks and thus to achieve continuous utilisation of a number of presses corresponding to the finished product. In the case of such continuous operation and the consequent processing of the moist synthetic resin moulding compound emerging directly out of the moulding compound plant, there is the further advantage that pressing operations can be performed with low moulding pressure, so that it is possible to work with heated pressing tools of aluminium, zamak, zinc alloys or with pressing tools manufactured by the galvanotechnique. In this case it would even be possible to use pressing tools with what are known as floating lock edges instead of the otherwise usual and expensive tools with dip edges.

By way of example, an embodiment of the invention with all plant parts and equipment necessary for a fully automatic operation shall now be briefly explained with reference to the drawing.

Figure 1:
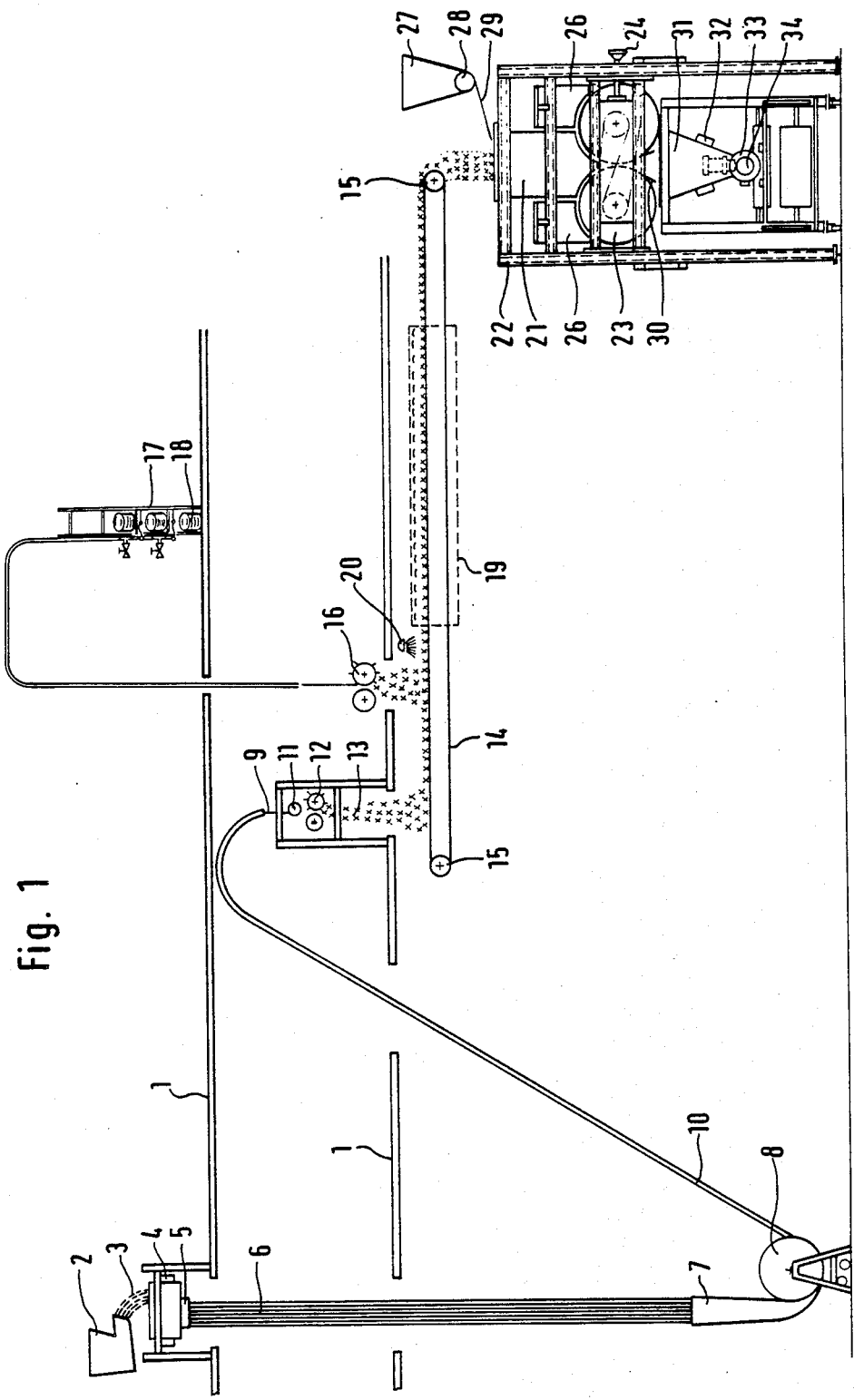
FIG. 1 is a diagrammatic view of a manufacturing apparatus in accordance with the present invention.

In FIG. (1) there is depicted at the left side a spinning plant of known design, which extends partly above and partly below the intermediate bottom (1). At point (2) the glass-forming base materials are fed in and mixed. At point (3) they enter into the glass melting furnace (4). The glass melted here comes out of the spinning nozzle bodies (5) in monofilaments (6) and comes into the spinning hopper (7). In the spinning wheel drum (8) with spinning wheel the roving spin strands (9) are formed and led via pneumatic conveyor devices (10) along a sizing facility (11), where the endless spin strands are sized with chemicals and then further advanced directly to a cutter attachment (12). The cut spin rovings (13) fall onto an endless conveyor belt (14) with guide and drive rollers (15). Another cutter attachment for glass rovings is indicated at (16), said glass rovings being uncoiled by a roving frame (17) with roving spools (18). The rovings cut at (16) may have Tex units other than the spin rovings (9). Operations can be performed with both cutter attachments (12) and (16), or only with the cutter attachment (16) by itself when the spinning plant is not in operation. The produced cut spin rovings (9) and/or rovings (16) are sprayed with a binder, e.g. a P.V.A. dispersion (20) prior to entering the drying equipment (19), then they are dried and led to the input vat (21) of the actual moulding compound plant (22). This contains two rollers (23) which rotate counter to one another. The roller gap is adjustable by virtue of the fact that the right roller can be displaced in a horizontal direction by way of an adjusting device (24). Above the outer halves of the rollers (23) are arranged the doctor vats (26) into which the resin compounds in viscous pumpable condition are conveyed by way of pipelines not shown in the FIG.

By means of a feed funnel (27) with feed roller (28) and guide plate (29), additives and fillers such as fine gravel, quartz sand, marbles are brought to the vat (21). As a result, the viscosity of the resin compound is increased. Certain fillers such as $Al_2(OH)_3$—$SiO_2$— also improve the chemical stability, the flame resistance and the non-abrasive quality of the finished product. By way of the roller gap, the fed materials, fibers and fillers are saturated with the resin preparation. The compound is released from the rollers by means of scrapers (30) and falls into the spring-mounted hopper (31) which is made to oscillate by means of various ultrasonic vibrators (32). As a result, the compounds in the lower part of the hopper are compressed and pass over here into the metering and portioning device (33). This, as already mentioned, may consist of an extruder with modified short conically shaped pattern of housing and screw. Then at the outlet there is arranged a cutter attachment (34) which portions strands of adjustable length.

According to the example of embodiment as depicted in FIG. (2), a piston compressor serves as portioning device. This has a main cylinder (36), the wall of which joins up to the lower end of the spring-mounted hopper (31) of the moulding compound plant and has an opening (35) here. The piston (37) gliding in the main cylinder (36) is of such a length that it closes the opening (35) when it is moved to the left. At the left end of the main cylinder (36) there is connected up a further cylinder (38), in which a piston (39) presses to the right with a force which is adjustable for example hydraulically. By means of a drive (40), the cylinder (38) can be displaced downwards into the position shown by the broken line, and attached to its right end at the top there is a cover (42) for the main cylinder, so that this cover closes the main cylinder at the end of its left section (41) when the cylinder (38) is down in the position shown by the broken line.

Portioning now takes place in such a manner that the piston (37) is moved to the left at periodic intervals and thereby the synthetic resin compound entering out of the hopper (31) is pushed to the left into section (41) of the cylinder (36) and at the same time it is compacted and deaerated. After several strokes of the piston, the compound transfers across into the second cylinder (38) under counterpressure. The piston (39) falls back to the left according to the adjusted counterpressure and on reaching a previously adjusted piston path of the piston (39) the slide movement is initiated by means of a corresponding electronic signal: The drive (40) displaces the cylinder (38) downwards, the cover (42) closes the cylinder (36) and the portion (43) of the synthetic resin compound accumulated in the cylinder (38) and corresponding to a previously adjusted value of density and mass is ejected. It drops onto a piece of fiber mat (44) which was brought along on a conveyor belt (45). The conveyor belt is regulated by a positioning device at such a cycle-rate that there is always a piece of fiber mat (44) at the ejection position of the cylinder (38). The conveyor belt transports to the moulding presses the portions of synthetic resin compound with the the piece of fiber mat as support. The counter of the compound portions can be adapted to the mould, for example in that the cross-section of the cylinder (38) has a shape other than circular.

The FIGS. (3) and (4) illustrate in outline the working procedure of a fiber mat plant. At the left part of FIG. (3) there is located the spinning plant which was explained with reference to FIG. (1). The emerging rovings are forwarded in pneumatic spreader devices (46), the working method of which may be gleaned from FIG. (4).

Six spreader stations (46), which are moved laterally from a common drive (47), deposit the rovings in overlapping loops on the conveyor belt of the plant. With a spray attachment (48), binders such as P.V.A. dispersions are applied, which glue the fibers at the points where they cross one another. Additionally, and corresponding to the representation according to FIG. (1), cut rovings can also be flocked through corresponding feeding equipment. The density of the fibers on the conveyor belt can be varied by means of the speed of travel of the belt. If a belt is moving slowly, more fibers are deposited per unit area.

As already mentioned, a fiber mat with a particularly favourable influence on the finished product is obtained when several pneumatic spreader devices (46) are arranged behind one another in the direction of travel of the conveyor belt, whereby these spreaders are charged with spin rovings. The first spreader device then deposits spin rovings for example of 50 to 60 Tex units (weight in grams per 1000 meters length of fiber), the rovings deposited by the following spreader devices ranging from 100 to 400 Tex units.

Since the rovings first deposited form the lowest layer of the fiber mat, and since the piece of fiber mat is put into the mould, and since in the case of certain synthetic resin articles the lowest layer is visible in the surface layer, a favourable optical fashioning of the surface of the finished product can be obtained with this working procedure.

As indicated in FIG. (3), the deposited components pass through a drying kiln (49), emerge from it as a relatively sturdy fiber mat and are rolled up to a stack roll (50).

Figure 2:
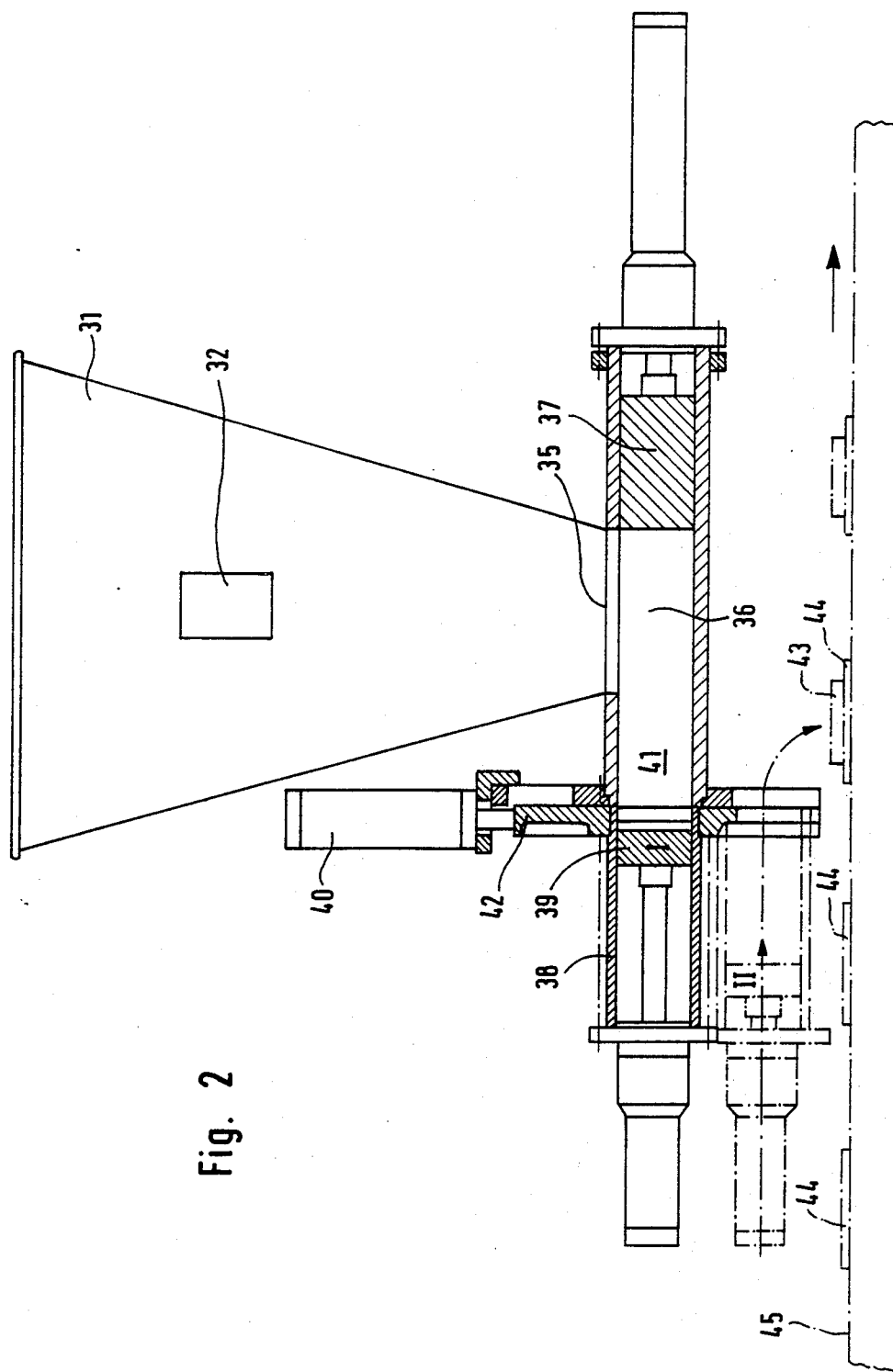
FIG. 2 is an elevational view, with parts in section, showing a compound batching and discharging apparatus.
Figure 3:
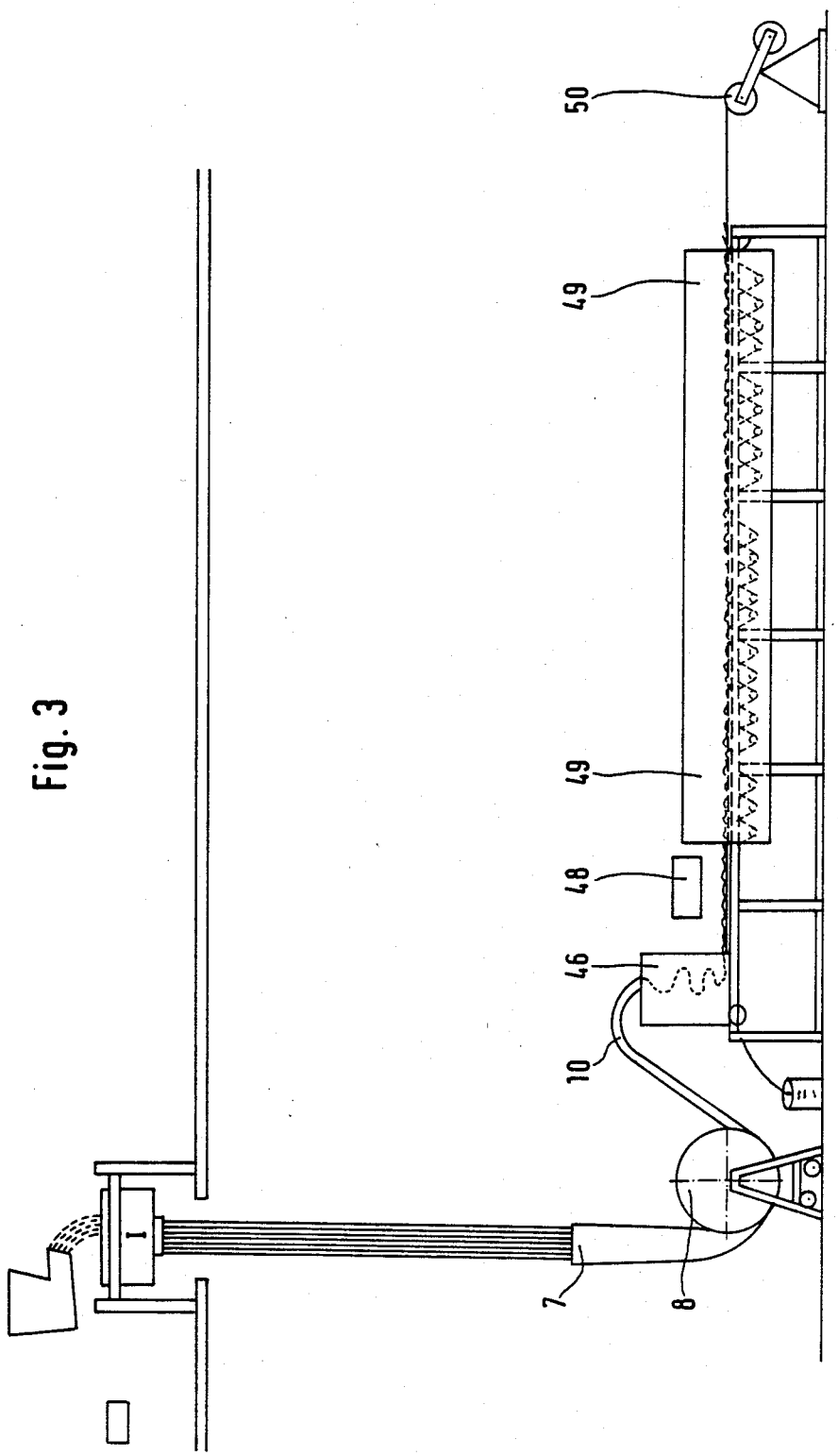
FIG. 3 is an elevational, partly diagrammatic view of a monofilament and mat producing apparatus.
Figure 4:
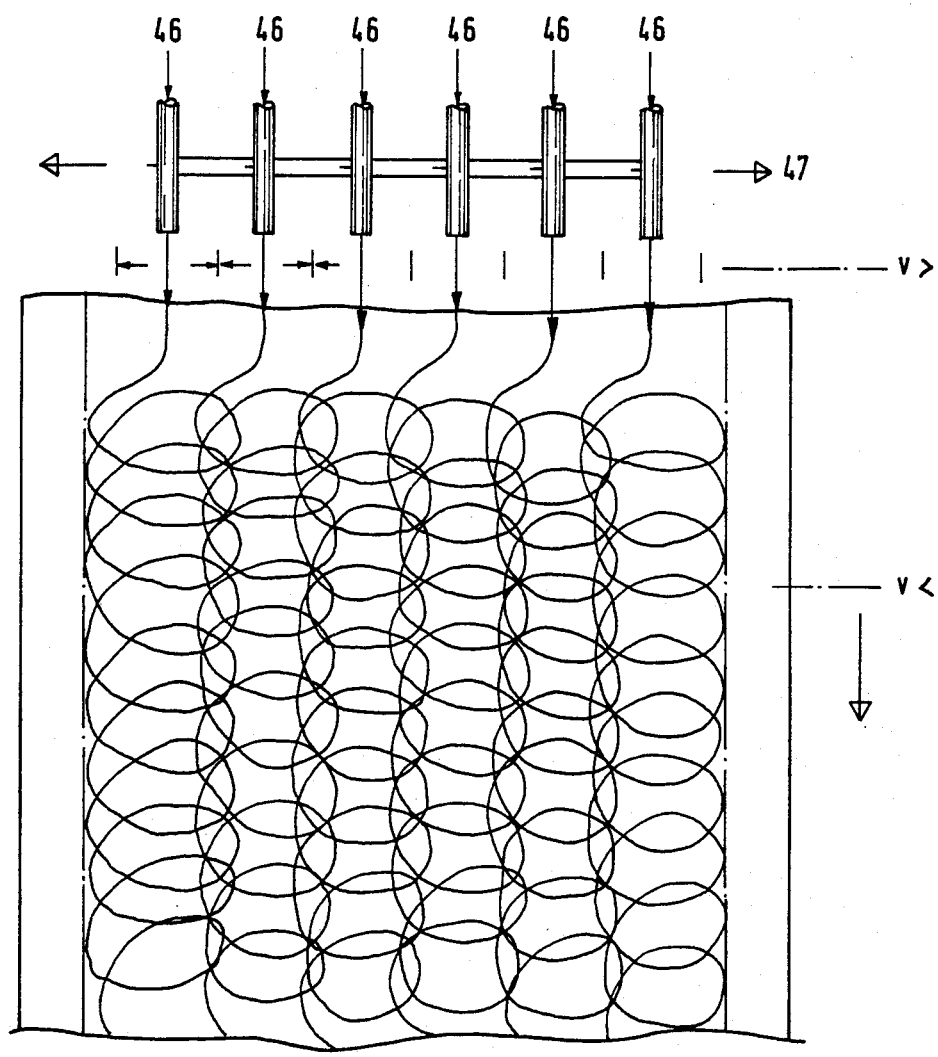
FIG. 4 is plan view of the mat producing apparatus.
Figure 5:
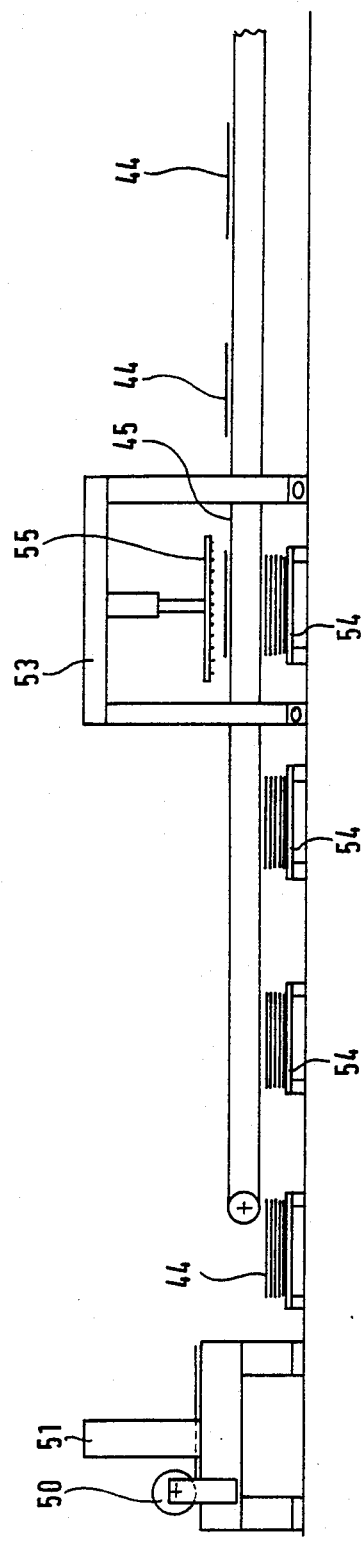
FIG. 5 is a view of a mat cutting apparatus, a conveyor and a feeding apparatus for the conveyor.

FIG. (5) shows in outline the punching device with stacking gear and positioning device. The roll of fiber mat (50) is fed to the punch (51), which ejects and stacks the pieces of fiber mat (44). As mentioned already, by correspondingly shaping the punching tool it is possible that the shape of the piece of fiber mat by adapted to the shape of the finished product. The positioning device (53) for the pieces of fiber mat travels along the pallets with pieces of fiber mat (54) and with the aid of a forked plate (55) takes each time from the stack the required piece of fiber mat and deposits it on the conveyor belt (45). The pieces of fiber mat are then fed one after another to the portioning device (FIG. 2) for the synthetic resin compound.

I claim:

1. A process for manufacturing products from fiber-reinforced synthetic resin compound and fiber matter comprising:
   (a) making a plurality of batches of fiber-reinforced thermo-setting synthetic resin compound without wrapping and having a sufficiently high viscosity that substantially no impregnation of a glass fiber mat will occur at ambient temperature,
   (b) providing a plurality of mats of material capable of being impregnated by said fiber-reinforced synthetic resin compound upon heating thereof, each said mat having an area and shape which correspond to the final product,
   (c) providing molding apparatus including heatable molds,
   (d) placing a said batch of resin compound without wrapping on a said mat immediately after making said batch of resin compound, (e) transporting a mat with a said batch of resin compound thereon to said molding apparatus, and (f) molding said batch and mat in said molding apparatus by applying heat and pressure thereto.

2. The process of claim 1, and further comprising providing a conveyor, placing said mats individually on said conveyor for said transporting thereof, and placing each of said batches of synthetic resin compound free of wrapping on a mat while said mat is on said conveyor.

3. A process for manufacturing in an uninterrupted sequence of operations flat products with a large surface, consisting of a carrier made from a glass fiber mat and embedded in a thermo-setting synthetic resin compound, comprising:

manufacturing an indeterminate length of multi-layer glass fiber mat, cutting the glass fiber mat into pieces the area and shape of which correspond to the final product, producing a plurality of metered batches without wrapping, of a thermo-setting resin and thereafter placing a said batch onto a said piece of the glass fiber mat without wrapping said batches, said thermo-setting resin having a sufficiently high viscosity that substantially no impregnation of the glass fiber by said thermo-setting resin occurs at ambient temperature, conveying the pieces of mat each with a said metered batch of thermo-setting resin thereon in sequence to a heatable moulding apparatus and placing each said conveyed mat and batch in said moulding apparatus, heating the mould of said moulding apparatus to liquify the thermo-setting resin thereon to cause said thermo-setting resin to impregnate the glass fiber mat, and compressing the resin impregnated glass fiber mat at a temperature at least as high as the curing temperature of the thermo-setting resin.

4. The process for manufacturing flat products with a large surface as set forth in claim 3, and further comprising cutting a portion of said glass rovings into small lengths, and introducing said small lengths of glass rovings into a large batch of said thermo-setting resin prior to metering thereof.

5. The process for manufacturing flat product with a large surface as set forth in claim 4, wherein during a first period of time said glass rovings are provided for the laying thereof, and during a second period of time said glass rovings are cut into short lengths, and adding said lengths of glass rovings to said thermo-setting resin prior to said placing thereof.

6. The process for manufacturing flat products with a large surface as set forth in claim 3, wherein said producing of a plurality of metered batches of thermo-setting resin and placing a said batch onto a said piece of said glass fiber mat, comprises producing said batches sequentially and placing each batch, as produced, directly onto a said mat.

7. Apparatus for manufacturing blanks form fiber-reinforced synthetic resin compounds for automatic feeding of synthetic resin molding presses, said presses producing fiber-reinforced synthetic resin goods, comprising:

(a) a molding plant for producing synthetic resin compound comprising a pair of rollers, means for rotating said rollers in opposite directions, and means for feeding pumpable resin components, fiber components such as cut glass and mineral fibers and additives to the rollers, and vibrating hopper means for receiving material from said rollers;

(b) batching means for receiving material from said vibrating hopper means and for compressing the synthetic resin compounds received from said hopper means into batches of predetermined weight and density, said batching means being without means for wrapping said batches;

(c) means for producing resin bonded fiber mats with structure and filling weight adapted to the desired pattern of fiber reinforcement of the synthetic resin goods to be produced;

(d) stamping means for stamping pieces out of the fiber mat having shapes which conform to the shape of the synthetic resin goods to be produced;

(e) means for delivering each of said batches provided by said batching means, without wrapping thereon, onto a piece of fiber mat so that each batch of synthetic resin compound is supported by a piece of fiber mat, and (f) means for transporting the fiber mat pieces together with the synthetic resin compound batches supported on them.

8. The apparatus of claim 7, wherein the batching means comprises a compression cylinder having a reciprocating compressing piston and a section which is open to the hopper, the opening in said section being sealed by the piston in one position thereof, said cylinder having a second section in which the piston displaces the compound added from the hopper, means for creating below atmospheric pressure in said second section, a second cylinder having an open end and a piston therein, means for moving said second cylinder between a first position in which the open end thereof is in alignment with said first cylinder for receiving material therefrom, and a second position displaced from the first position, said first cylinder having an open end and sealing means for the open end thereof, means for moving said sealing means into position for sealing the open end of the first cylinder upon displacement of the second cylinder into the second position thereof, and means for ejecting a compressed batch of the synthetic resin compound from the second cylinder in the second position thereof.

9. The apparatus of claim 7, said means for producing resin bonded fiber mats commmprising a conveyor belt, means for depositing continuous endless spun rovings in overlapping loops onto said conveyor belt comprising spreading devices and means for causing said spreading devices to move laterally of the direction of travel of said conveyor belt, and means for depositing material onto said rovings.

10. The apparatus of claim 9, said material depositing means comprising means for spraying material and/or cut rovings onto said endless spun rovings on said conveyor belt.

11. The apparatus of claim 7, wherein said means for producing resin bonded fiber mats comprises a conveyor belt, plural spreader means for depositing rovings onto said conveyor belt, and spaced along the conveyor belt in the direction of travel thereof, spreader means at the start of the sequence of spreader means comprising means for delivering relatively fine rovings, and subsequent spreader means comprising means for delivering relatively thicker rovings.

12. The apparatus of claim 11, wherein the first mentioned spreader means comprises means for delivering rovings having a fiber finesse of 50-60 tex and subsequent spreader means comprising means for deliverinng fiber of 100-200 tex or 200-400 tex.

13. Apparatus for manufacturing blanks from fiber-reinforced synthetic resin compounds for automatic feeding of synthetic resin molding presses comprising:
  (a) means for producing synthetic resin compound having fiber-reinforcement therein and having a sufficiently high viscosity with substantially no impregnation of a glass fiber mat will occur at ambient temperature,
  (b) means for receiving fiber-reinforced synthetic resin compound from said first mentioned means and for discharging said compound in sequential, measured batches thereof,
  (c) transporting means for transporting materials thereon,
  (d) means for delivering mats sequentially to said transporting means for sequential transportation of said mats thereon,
  (e) means for sequentially discharging each of said batches of reinforced synthetic resin compound onto one of said sequentially presented mats transported by said transporting means, and
  (f) means for molding said batch and said mat to produce a blank.

* * * * *